(12) United States Patent
Olson (10) Patent No.: US 6,386,596 B1
(45) Date of Patent: May 14, 2002

(54) QUICK-CONNECT HOSE END COUPLINGS

(75) Inventor: Darwin Olson, Franklin, TN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/626,543

(22) Filed: Jul. 26, 2000

Related U.S. Application Data (63) Continuation-in-part of application No. 09/525,456, filed on Mar. 15, 2000.

(51) Int. Cl.[7] ................................................ F16L 39/00
(52) U.S. Cl. ........................ 285/321; 285/305; 285/308
(58) Field of Search ................................ 285/321, 305, 285/308

(56) References Cited

U.S. PATENT DOCUMENTS

| | | | | |
|---|---|---|---|---|
| 3,314,696 A | * | 4/1967 | Ferguson et al. | 285/174 |
| 4,423,892 A | * | 1/1984 | Bartholomew | 285/319 |
| 5,356,183 A | * | 10/1994 | Cole | 285/305 |
| 5,405,175 A | * | 4/1995 | Bonnah, II et al. | 285/305 |
| 5,498,042 A | * | 3/1996 | Dole | 285/177 |
| 5,683,117 A | * | 11/1997 | Corbett et al. | 285/24 |
| 5,730,481 A | * | 3/1998 | Szabo et al. | 285/305 |
| 5,876,071 A | * | 3/1999 | Aldridge | 285/321 |
| 5,882,044 A | * | 3/1999 | Sloane | 285/92 |
| 5,964,483 A | * | 10/1999 | Long et al. | 285/305 |
| 6,050,500 A | * | 4/2000 | Ensworth | 239/203 |
| 6,102,447 A | * | 8/2000 | Aldridge | 285/305 |
| 6,113,151 A | * | 9/2000 | Beans | 285/23 |
| 6,179,347 B1 | * | 1/2001 | Dole et al. | 285/321 |
| 6,231,084 B1 | * | 5/2001 | Hester et al. | 285/23 |
| 6,276,399 B1 | * | 8/2001 | Fox | 138/109 |
| 6,318,764 B1 | * | 11/2001 | Trede et al. | 285/305 |
| 2001/0017469 A1 | * | 8/2001 | Sausner et al. | 285/305 |

* cited by examiner

*Primary Examiner*—J. J. Swann
*Assistant Examiner*—J. Allen Shriver
(74) *Attorney, Agent, or Firm*—Millen, White, Zelano & Branigan, P.C.

(57) ABSTRACT

A quick-connect coupling for non-rotatably connecting a hose to a male stem member is made of plastic and in accordance with a first embodiment includes a plastic fitting body on which is mounted a plastic annular cap having depending lugs. The cap is welded or otherwise fixed to the end of the fitting body. A collet is slid into the annular cap. The collet has depending arms which nest between the lugs on the annular cap so that the collet does not rotate. Detents on the arms seat in a groove on the male stem member to retain the stem member within the fitting body. In accordance with a second embodiment, the fitting body is in the form of a unitary female member which utilizes a substantially C-shaped resilient detent inserted radially through a slot in the female member to retain the male stem member therein by seating in a circumferential groove in the male stem member. The male stem member is made from hex-bar stock and is received in a hexagonal socket portion in the female member to prevent relative rotation of the members.

17 Claims, 7 Drawing Sheets

QUICK-CONNECT HOSE END COUPLINGS

RELATED PATENT APPLICATIONS

This application is a continuation-in-part of application Ser. No. 09/525,456, filed on Mar. 15, 2000.

FIELD OF THE INVENTION

The present invention is directed to quick-connect hose end couplings. More particularly, the present invention is directed to quick-connect couplings wherein the couplings couple hoses to fittings in a non-rotational relationship.

BACKGROUND OF THE INVENTION

Pneumatic devices, such as air brakes, are widely used in the automotive industry. Typically compressed air stored in tanks is applied to air brake operating mechanisms through flexible hoses which have couplings at both ends that couple with male stem members. If the ends tend to twist with respect to one another, collets within the couplings wear quite rapidly which can lead to failure of the collets and thus the coupling.

Current non-rotational couplings have collets in bodies made of brass which tend to wear due to vibration when hoses with which the couplings are used are not pressurized. Moreover, there are plant capacity limitations when brass collets and brass fitting bodies are used. In that brass components are expensive, significant cost reductions are available by not utilizing brass components. In addition, there are advantages to using non-brass components because devices such as hose end bodies which have a 90 degree bend are much easier and less expensive to produce when they are not made of brass.

In addition, there is need to provide a coupling configuration which acts directly on a collet to prevent rotation of the collet when the coupling is engaged as well as arrangements which resist clogging of collets by dirt and foreign objects.

Couplings which are pressurized infrequently but still have significant and continuous vibration applied thereto tend to wear if the collets associated therewith are allowed to rotate or move due to vibration. This phenomenon can reduce the life of coupling components and needs to be addressed.

A continuing concern with respect to an manufactured product is the cost of the components. Accordingly, when a component can be made of molded plastic rather then machined metal it is usually less expensive. Moreover, the component will have fewer critical dimension characteristics which has a tendency to increase reliability and to further decrease costs.

Quick-connect air brake couplings frequently utilize collets machined to close tolerances. Therefore, the collets tend to be relatively expensive. In addition, the female portions of the quick-connect coupling used for air brakes are machined of brass which is of course very expensive. Moreover, in many prior art arrangements, an O-ring seal is installed in the female member increasing chances for damage during assembling.

Metal adapters which are in the form of a male stem member frequently require a wobble broach machining process which is a complex operation, in order to reduce costs it would be desirable to use standard hex-bar stock, rather then bar stock which is not standard.

If possible, it would be desirable to reduce the number of molds to purchase by reducing the number of molded parts. Morever, by reducing the number of molded parts the need to join the parts by spin welding or ultrasonic welding is eliminated. During maintenance and repair, if O-rings are within the female member, replacement is more difficult because damaged O-rings are not visible. Consequently, assembly and replacement is neither simple nor instinctive. With a plastic molded part, it is advantageous to have an anti-rotation hex which is larger because a larger hex facilitates assembly. Generally, there is a need for possible reduction of close tolerances on various components in order to facilitate assembly, reduce costs and increase reliability. Moreover, current quick-connect arrangements do not provide a clear visual indication that the coupling is locked in its connected position because the locking collet is almost completely within the female component. Consequently, there is the danger that the coupling may separate during testing or in the field.

In view of the aforementioned considerations, there is a need for improvements in hose couplings which have a non-rotational connection with male stem members.

SUMMARY OF THE INVENTION

In a first general embodiment the present invention is directed to a coupling arrangement or coupling a hose to a male stem having a non-circular end portion and a groove adjacent that end portion. The invention comprises a fitting body having a bore and first end portion adapted for connecting with a hose, and a second end portion adapted to receive the male stem. The body has a non-circular section adapted to receive a non-circular end portion of the stem as well as a sealing section between the non-circular section and the first end portion. A cap member is disposed in fixed relation at the first end of the fitting body, the cap member having axially extending lugs with axially extending spaces therebetween which extend into the bore of the body. A collet is seated within the cap member, the collet having axially extending arms received within the axially extending spaces between the axially extending lugs of the cap wherein the collet is restrained from rotation within the cap. The arms of the cap have a first detent thereon adapted to be received in the groove on the male stem to lock the stem within the fitting body when the collet is in a locked position. A seal is disposed in the sealing section of the fitting body between the lugs and is adapted to engage the male stem in a radial direction.

In accordance with a further aspect of the invention, the collet, body and cap are made of a plastic material.

In further aspects of the invention, the lugs on the cap have inwardly extending ribs for engaging the male stem adjacent the groove in the stem and the arms of the collet have externally projecting ribs which are received on lands in spaces between the axially extending lugs of the cap when the collet is in the locked position. In still further aspects of the invention, the arms and lugs have end faces which face the seal wherein the end faces of the lugs on the cap engage the seal to keep the seal from extruding between the arms of the collet.

In accordance with a second embodiment of the invention, the invention is directed to a coupling arrangement or coupling a hose to a male stem member having a non-circular portion thereon and a locking groove therein exposed between an insertion end and a coupling end. The invention comprises a female member having a first end portion adapted for connecting with the hose and a second end portion configured as a socket for receiving the male stem member. The female member includes a non-circular section adapted to receive the non-circular portion of the male stem member; a sealing section between the non-circular section and the first end portion, and a locking section. The locking section includes a first axially facing, radially extending shoulder and a radially opening slot. A substantially annular detent is inserted through the radially opening slot in the female member and disposed within the locking section of the female member. The substantially annular detent is received in the locking groove in the male stem member and has a first axially facing surface for engaging the axially facing, radially extending shoulder of the female member when the non-circular portion of the male stem member is within the non-circular section of the female member. Thus, the male stem member is rotatably and axially locked within the female member.

In a more specific aspect of the second embodiment of the invention, the detent member has a selected width in the axially direction and is mounted within an arcuate cavity having an axial extent greater then the selected width of the detent. Upon pressurizing the coupling arrangement with internal fluid pressure, the male stem member moves in a direction away from the female member engaging the axial facing surface of the detent member with the first axially facing, radially extending shoulder of the female member.

In another aspect of the invention, the arcuate cavity has a first section which is radially unobstructed allowing radial movement of the substantially annular detent and a second section having blocking elements which inhabit radial movement above the annular detent.

In other aspects of the invention, the substantially annular detent is substantially C-shaped allowing detent to be radially slipped through the radially opened slot in the female member and allowing the substantially annular detent to expand radially to receive the male stem member therethrough and to thereafter contract into the groove in the male stem member.

In accordance with additional aspects of the invention, the female member and substantially annular detent are both made of plastic material.

In still another aspect of the invention, the male stem member is made of metal hex-bar stock.

Upon further study of the specification and appended claims, further features and advantages of this invention will become apparent to those skilled in the art.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
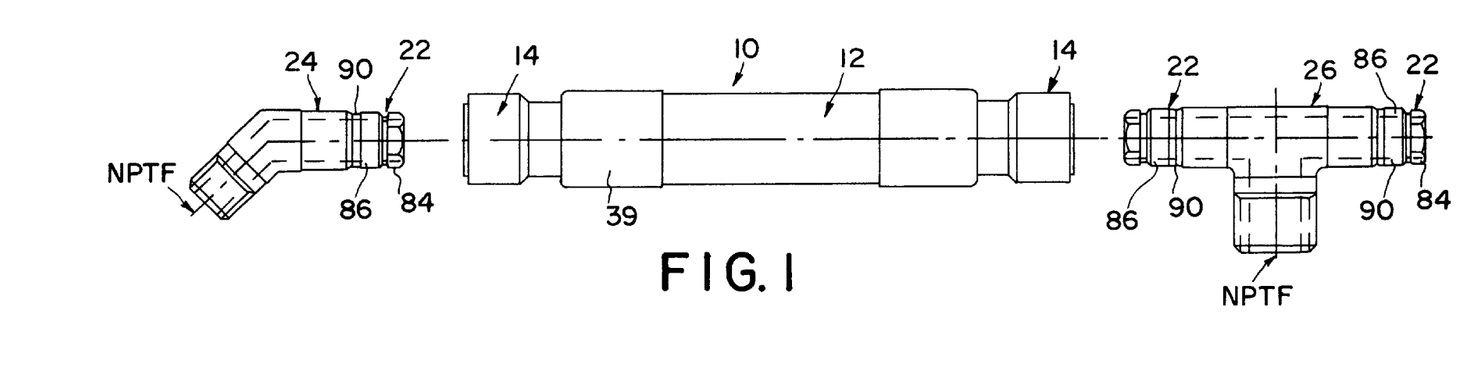
FIG. 1 is a side view of a hose having hose end coupling arrangements with fitting bodies which couple with male stem members.
Figure 2:
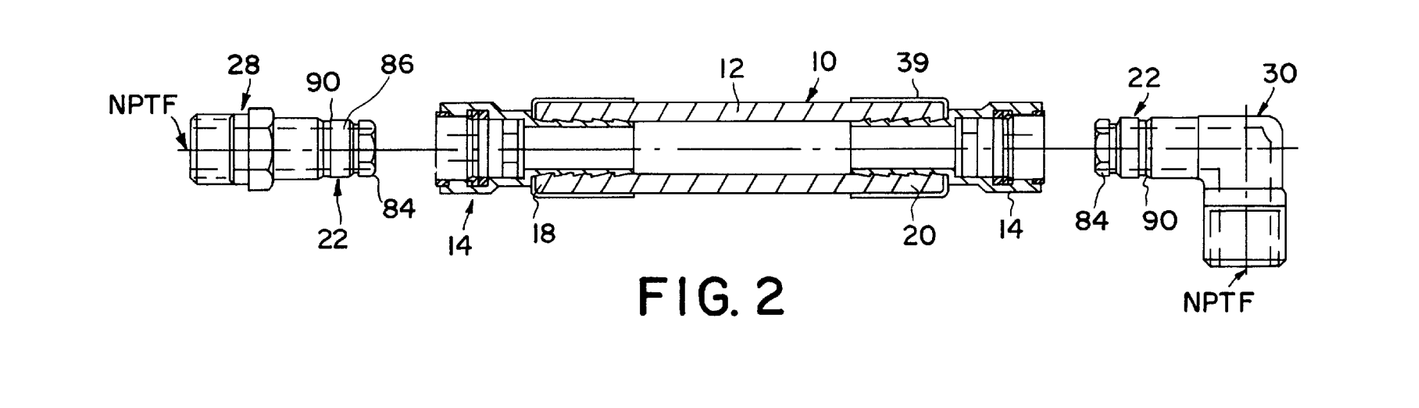
FIG. 2 is a view similar to FIG. 1 but showing the hose and hose end coupling arrangements in elevation with different male stem members than those of FIG. 1.

Referring now to FIGS. 1 and 2, there is a shown a hose assembly (10) configured in accordance with the principles of the present invention wherein a hose (12) has coupling arrangements (14) according to a first general embodiment of the invention at opposite ends (18 and 20) of the hose. The coupling arrangements (14) couple with male stems having coupling portions (22). The male stems may be of various configurations such as the male stem (24) which is obtusely angled, the male stem (26) which is T-shaped, the male stem (28) which is straight or the male stem (30) which is L-shaped. The coupling portions (22) of the various male stems (24–30) are configured for cooperation with the coupling arrangements (14) at the ends (18 and 20) of the hose (12).

In the illustrated embodiment of the invention, the hose assembly (10) may be used as drop line from the frame rail of a tractor trailer down to a brake chamber, with the hose (12) being of a conventional air brake hose configuration and coupling assemblies (14) being plastic. The male stem members (24–30) are brass machining. While the illustrated coupling arrangements have a particular use with hose assemblies (10) used for drop lines, the coupling assemblies (14) may be used for any application where a coupling arrangement has a non-rotatable engagement with a male stem. In accordance with features of the present invention, the coupling arrangement (14) is made of plastic material, such as an engineering plastic which for example may be glass filled NYLON® or any other plastic material which is suitable for the desired application.

Figure 3:
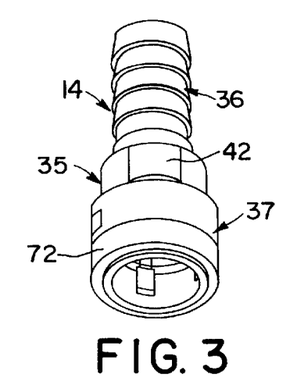
FIG. 3 is a prospective view of a hose end coupling arrangement.
Figure 4:
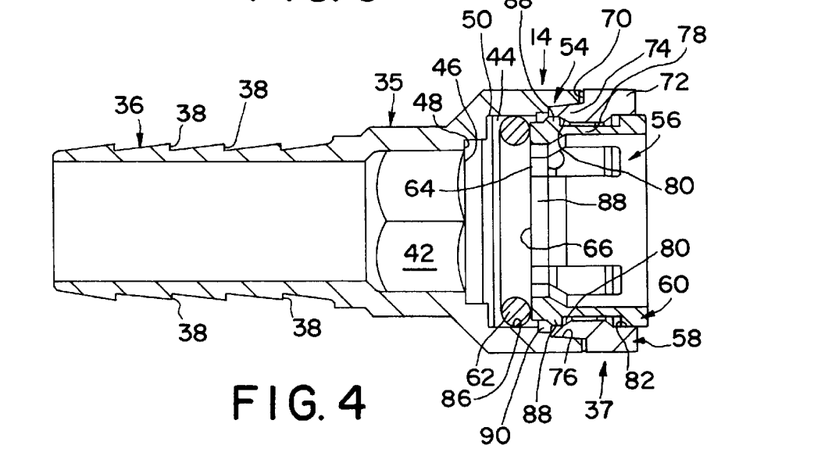
FIG. 4 is a side elevation of the end coupling arrangement of FIG. 3.
Figure 5:
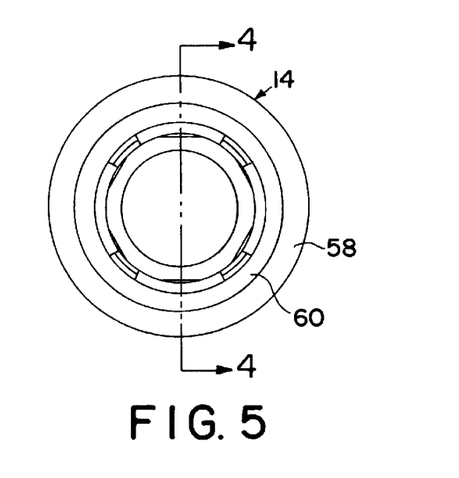
FIG. 5 is an end view of the end coupling arrangement of FIGS. 3 and 4.

Referring now to the enlarged FIGS. 3–5 where the coupling arrangement (14) according to the present invention is shown in isolation, it is seen that the coupling arrangement includes a fitting body (35) having a first end portion (36) and a second end portion (37). The first end portion (36) is received within a hose, such as the hose (12) of FIGS. 1 and 2, while the second end portion (37) couples with the coupling portion (22) of a male stem member such as the male stem members (24–30) of FIG. 1 and 2. The first end portion (36) has a series of annular teeth (38) which grip the material of the hose (12) so as to retain the hose (12) thereon when a collar, such as a crimping collar (39) (FIGS. 1 and 2) squeezes the hose against the annular teeth. Between the first and second end portions (36 and 37) of the fitting body (35) there is disposed a non-circular portion (42) which is shaped as a hexagon, the non-circular portion (42) being joined to a sealing section (44) by a double step (46) which has a first shoulder (48) and a second shoulder (50). Outboard of the sealing section (44) there is a quick-connect coupling section (54) that receives a quick-connect coupling arrangement (56) that is comprised of a cap (58) and a collet (60). A seal is provided by an O-ring (62) which is disposed between the shoulder (50) and ends (64 and 66) of the cap (58) and collet (60), respectively.

In accordance with the present invention, the cap (58) is ultrasonically welded to the second end portion (37) of the fitting body (35) which is accomplished in accordance with known procedures since both the cap (58) and the coupling arrangement (35) are made of plastic material. As is readily seen in FIG. 4, the cap (58) has a step (70) separating an exterior collar portion (72) from an insertion portion (74) wherein the step (70) abuts an end face (76) of the end portion (37) of the coupling arrangement (35). The cap (58) is thus integral with the second end portion (37) and non-rotatably fixed thereon. Alternatively, the cap (58) may be a cap portion that is unitary with the fitting body (35).

The collet (60) is axially slid into the cap (58) and retained therein by external ribs (78) which seat behind a concave surface (80) in the cap (58). After the collet (60) has been axially pushed into the cap (58) it is seen that there is a gap (82) which allows for axial movement of the collet (60) in order to allow for a quick disconnect of the coupling portion (22) of the male stem member from the coupling arrangement (35).

In operation, the male stem member coupling portion (22) which has a non-circular end portion (84) in the form of a hexagon is pushed through the collet (60). The non-circular portion (84) of the male stem coupling portion (22) complements the non-circular portion (42) of the coupling arrangement (35) so that the fittings (24–30) (FIGS. 1 and 2) do not rotate within the coupling arrangement (35) and therefor do not rotate with respect to the hose (12). When the male stem member coupling portion (22) is pushed home, the O-ring reel (62) forms a radial seal against a circular sealing surface (86) on the coupling portion (22) of the male stem member, while detents (88) on the collet (60) seat within the circular groove (90) disposed adjacent the sealing surface (86) so as to lock the coupling portion (22) of the male stem member within the coupling arrangement (14). When it is desired to decouple the hose arrangement (10) from the male stem coupling portion (22), the collet (60) is moved inwardly to close the gap (82) so that the exterior ribs (78) axially clear the end face (76) of the cap (58). This allows the free end portion (66) of the collet (60) to expand outwardly when the coupling portion (22) of the male stem is pulled in a direction axially away from the coupling arrangement (14).

Figure 6:
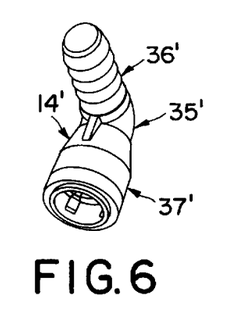
FIG. 6 is a prospective view of another embodiment of an end coupling arrangement in accordance with the present invention.
Figure 7:
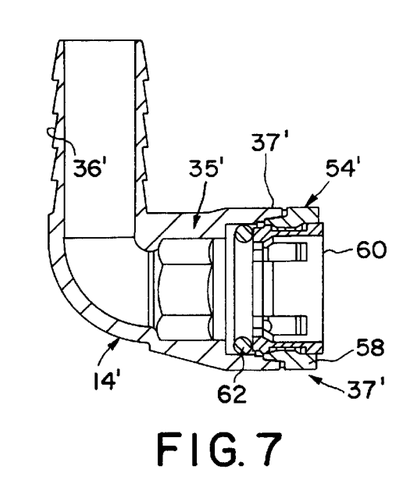
FIG. 7 is a side elevation of the end coupling arrangement of FIG. 6.
Figure 8:
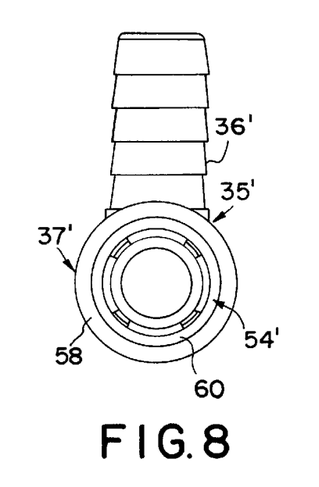
FIG. 8 is an end view of the end coupling arrangement of FIGS. 6 and 7.

Referring now to FIGS. 6–8 where another embodiment (14') of the coupling arrangement is shown, it is seen that the coupling arrangement is L-shaped with a 90 degree bend so that the first end portion (36') is perpendicular to the second end portion (37'). The coupling arrangement (14') of the second embodiment is substantially the same as the coupling arrangement (14) shown in FIG. 4 of the first embodiment in that the quick-connect portions (54) and (54') and the non-circular portions (42) and (42') are the same. There is an enormous economic advantage in making the fitting body (14') L-shaped because it is far less expensive to mold a fitting body from the plastic material than to machine a brass fitting. By making the fitting body (14') L-shaped, the male stem member can be made straight so that instead of using the L-shaped male stem member (30) of FIG. 2 an L-shaped fitting body (14') can be used in combination with a straight male stem member, such as the male stem member (28) of FIG. 2.

Figure 9:
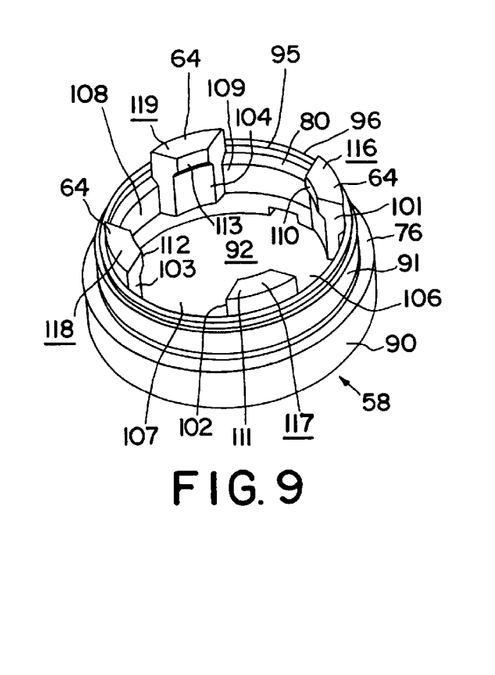
FIG. 9 is a top prospective view of a cap used with the coupling arrangement of FIGS. 1 through 8.
Figure 10:
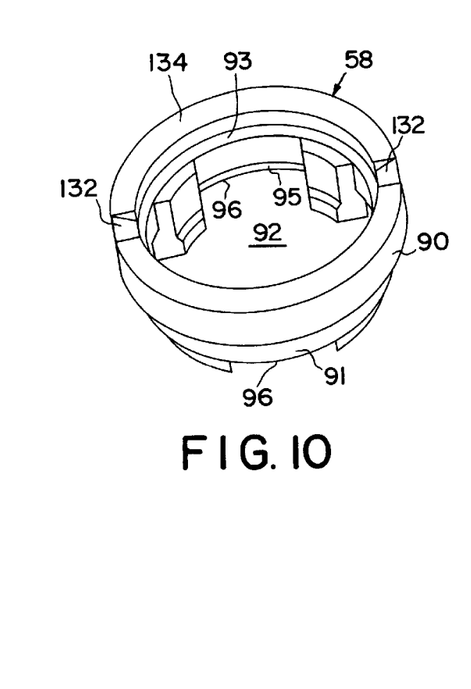
FIG. 10 is a prospective view of the other end of the cap of FIG. 9.
Figure 11:
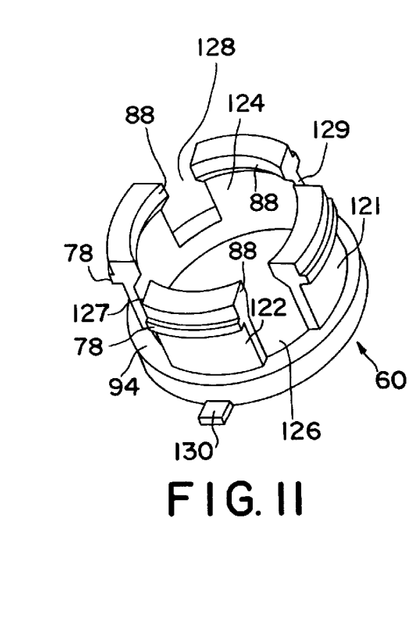
FIG. 11 is a prospective view of a collet which cooperates with the cap of FIGS. 9 and 10 to provide the coupling arrangement of FIGS. 1–8.

Referring now to FIGS. 9 and 10 in combination with FIG. 11 where the cap (58) and the collet (60) are shown isolated and in perspective, it is seen that the cap (58) has a collar portion (90) which extends axially past the axially-facing, radially-extending shoulder (76) and an inwardly extending collar (91) which projects inwardly from the radially-facing shoulder. The inwardly extending collar (91) engages the inner surface of the fitting body (35) (see FIGS. 4 and 7) while the collar (90) projects outwardly from the fitting body to help define an annular space (92) which receives the collet (60) there within. Within the collar (90) there is a shoulder (93) which axially faces a corresponding shoulder (94) on the collet (60) (see FIG. 11). The shoulder (93) serves as a stop when the collet (60) is pressed inwardly to clear the rib (78) from engagement with the cap at an axially-extending shoulder (95) when the collet (60) is pressed inwardly, in order to remove the male stem coupling (22) in order to disconnect the hose assembly (10) (FIGS. 1 and 2) from one of the male stem members (24–30).

The cap (58) has four axially-extending lugs (101, 102, 103 and 104). Between these lugs are spaces (106, 107, 108 and 109). The lugs (101-104) have inwardly projecting ribs (110–113) which engage and steady the male stem coupling (22) as it is slid into place by a budding the sealing surface (86) of the male stem coupling. Once the coupling (22) is seated, the ribs (110–113) are positioned over the groove (90) of the male stem coupling (22) but are not received in the groove. The lugs (101–104) have end faces (116–119) which face the O-ring (62) (see FIGS. 4 and 7). As will be explained further, these end faces (116–119) prevent the O-ring from extruding into the collet (60) and interfering with the integrity of the coupling arrangement (14).

Referring now mainly to FIG. 11, it is seen that the collet (60) has axially extending arms (121–124) with spaces (126–129) therebetween. When the collet (60) is slid into the cap (58), it is slid in so that the lugs (101–104) are received in spaces (126–129) of the collet and so that the arms (121–124) are received in the spaces (106–109) of the cap (58). Consequently, the collet nests within the cap (58) as is shown in FIGS. 4 and 7. The surface (80) is concave in that it slopes inwardly, consequently any pulling force on the male stem coupling (22) causes the surface (80) to cam the detents (88) more tightly into the groove (90) by progressively providing a radial force against the external ribs (78).

Since the spaces (126–129) are filled with the lugs (101–104) the tendency of the O-ring seal (62) to extrude between the arms (121–124) of the collet (60) is precluded. A pair of tabs (130) (only one of which is shown in FIG. 11) are received in grooves (132) in the exposed end face (134) of the cap (58) to facilitate initial alignment of the arms (121–124) with the spaces (106–109) between the lugs on the cap (58). The tabs (130) are flexible and fit into the slots (132) to assure that the collet (60) is in the locked position at all times regardless of whether or not the hose assembly (10) is pressurized or not. To disconnect the male stem coupling (22), the tabs (130) flex when the collet (60) is depressed when pushed toward the fitting body (35). Since the rim (30) helps assure that the collet (60) will be firmly squeezed against the male stem when excess pressure or an axial of load is applied to the hose, the tabs (130) may replace the rim (80) since the tabs (130) serve the same function.

In addition to the lugs (101–104) preventing rotation of the collet (60) and keeping the O-ring seal (62) from extruding into the collet, the lugs reduce the possibility of dirt and foreign objects entering the fitting body (35) through the gaps (126–129) of the collet while the ribs (110–113) engage against the male stem (22) to provide a retraction force on the stem which is precluded into the fitting body (35), thereby ensuring that the collet (60) remains in the locked position even when the hose assembly (10) is not pressurized.

Referring now to FIGS. 12–22 where a second general embodiment 200 of the invention is shown, it is seen that the coupling is made of only three parts, i.e., female member 202 molded of plastic material such as fiber-filled NYLON 7; a substantially annular detent 204 made of a material such as TOUGHENED ZYTEL 7 available from the DuPont Corporation, and a male stem member 206 which is preferably machined from metal hex-bar stock wherein the metal is brass. While the aforementioned materials have been specified, other types of plastics and metals may be utilized and still be within the scope of their invention. While FIGS. 12A and 12B show the coupling to scale, the FIGS. 13–22 show the coupling enlarged in order that details thereof are more discernable. A preferred use of the coupling 200 is as a quick-connect airbrake coupling for coupling a hose end (not shown) to a device. A nipple end 208 on the female member 202 has plurality of annular teeth 210. The hose is received over the nipple 208 and retained by the annular teeth 210. The male stem member 206 has a threaded end 212 which is received in a threaded opening of an airbrake device. As with the first embodiment of the invention, connecting portion 208 may extend axially as shown or may be at angle so the member 202 may be, for example, L-shaped or T-shaped or at a 45° angle. As will be further explained hereinafter, the coupling 200 has an unlocked mode, as is shown in FIG. 12A and a locked mode, as is shown in FIG. 12B.

Figures 12A, 12B, 13, 14:
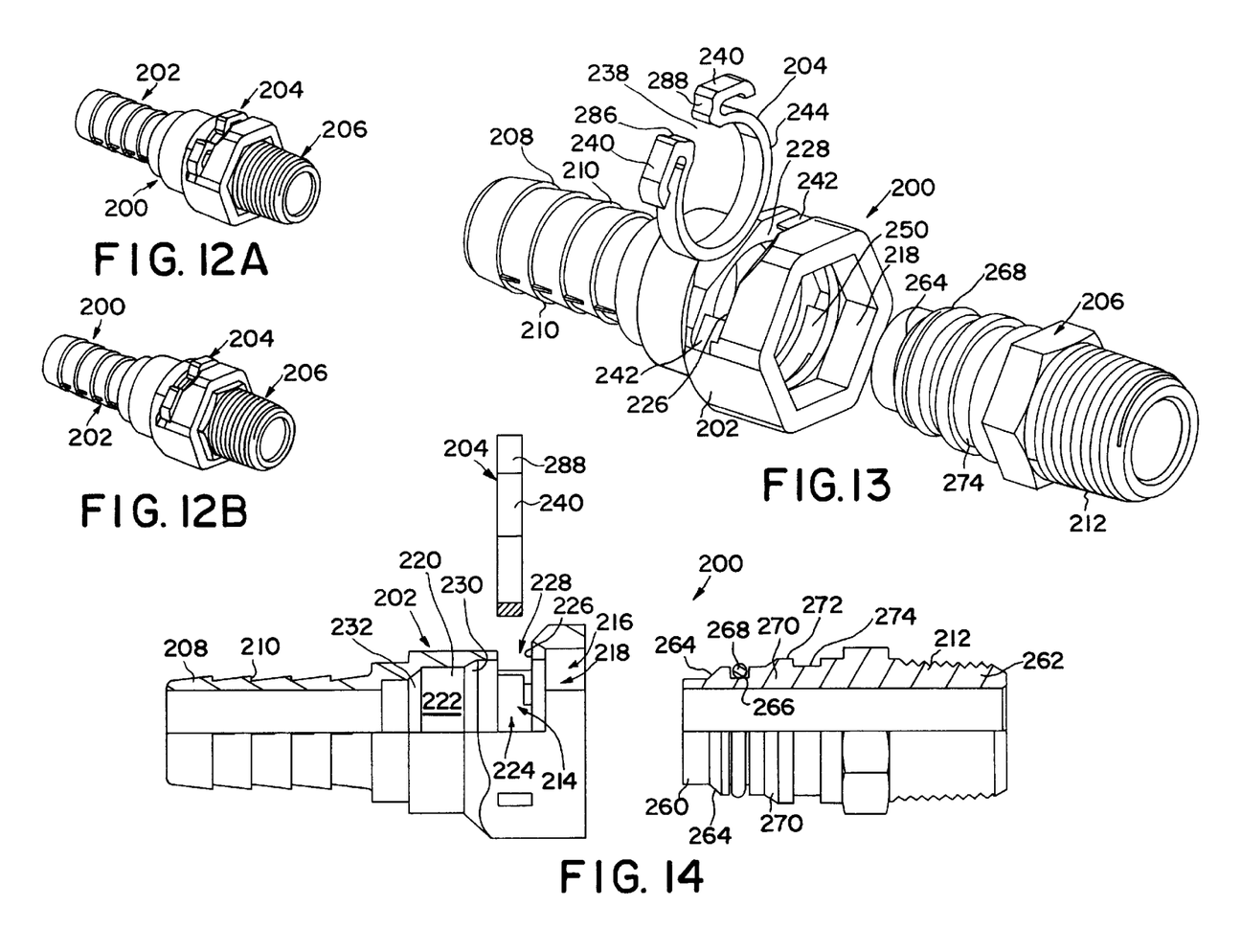
FIGS. 12A and 12B are perspective views of a second embodiment of a quick-connect airbrake coupling configured in accordance with the present invention shown approximately to actual size.
FIG. 13 is a perspective exploded view of the quick-connect coupling of FIGS. 12A and 12B, shown enlarged.
FIG. 14 is a side view, partially in elevation, of the quick-connect coupling of FIGS. 12A, and 12B and 13 shown exploded and enlarged.

As is seen in FIGS. 13 and 14, the female member 202 includes the first end portion which is the nipple 208 and a second end portion configured as a socket 216 for receiving the male stem member 206. The socket 216 includes non-circular section 218 which is configured as a hexagon and a sealing section 220 having a sealing surface 222 thereon. Between the non-secular section 218 and the sealing section 220 there is a locking section 224. Locking section 224 includes an axially facing radially extending first shoulder 226 and a radially opening slot 228. A first frustoconical, beveled surface 232 is adjacent the nipple 208 which comprises the first end of the female member 200, while a second frustoconical beveled portion 230 is disposed between the sealing surface 222 and the locking section 224.

Disposed within the socket section 216 is the substantially annular, C-shaped, detent 204 which is slidably received radially into the slot 228 by being pinched together so as to close the gap 238 in the C-shaped detent. Since the detent 204 is resilient it expands after being inserted in the slot 228 and becomes seated with a pair of arms 240 resting on lands 242 at the end of the slot 228. The detent 204 has a radially facing ending, axially facing surface 244 which faces the shoulder 226 at the end of the slot 228. The other end of the slot 228 is defined by a second shoulder 248 which cooperates with front shoulder 226 to define a cavity 250 which has a width greater then the width of the detent 204. As will be explained hereinafter, the cavity 250 enables the annular detent 204 to shift a short distance in the axial direction.

The male stem member 206 which functions as an adapter enabling a hose (not shown) to be connected by the threads 212 to an airbrake component such as a bridging device. The male stem member 206 includes an insertion end 260 and a connection end 262, the insertion end 260 includes a frustoconical, bevel surface 264 in front of a sealing groove 266 which retains a sealing O-ring 268. On the other side of the groove 266 is a second frustoconical beveled surface 270 which has a diameter greater then the first frustoconical beveled 264. Bordering the second surface 270 is a cylindrical surface 272 which is adjacent a locking groove 274. Locking groove 274 receives the substantially annular detent member 204 and is disposed between the cylindrical surface 272 and a second cylindrical surface 276. Adjacent the second cylindrical surface 276 is a hexagonal surface 280 which complements the hexagonal surface 216 on the female member 202.

Referring now to FIGS. 15–18, it is seen that when the insertion portion 260 of the male stem member 206 is inserted into the socket portion 216 of the female member 202, the beveled surfaces 264 and 270 engage and expand the annular detent 204 in a radially disposed gap 280 (see FIGS. 15 and 18) provided in the cavity 250 which is wider then the width of the annular detent 204. When the insertion portion 260 is shoved home within the socket portion 214 the surfaces 264 and 270 on the insertion portion engage the beveled surfaces 230 and 232 within the female member 202. The O-ring 268 is then sealed against the cylindrical sealing surface 222 on the sealing section 202 inside the female member 202.

Figure 15:
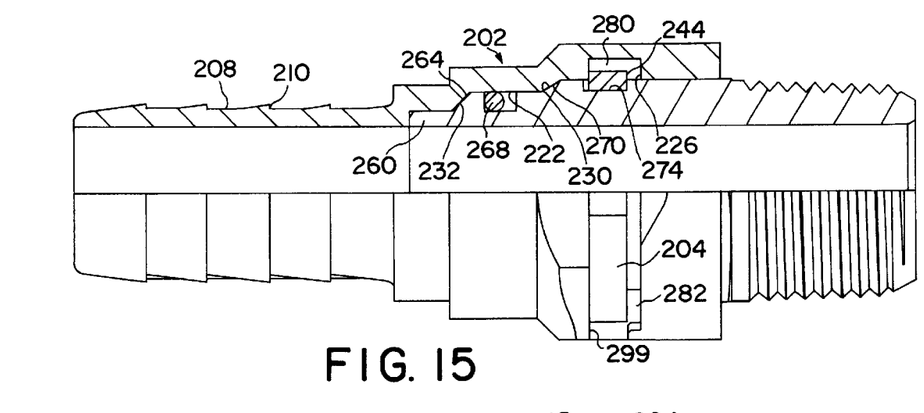
FIG. 15 is an enlarged side elevation of the quick-connect coupling of FIGS. 12–14 taken along lines 15—15 of FIG. 17, shown assembled and in an unlocked mode.
Figure 16:
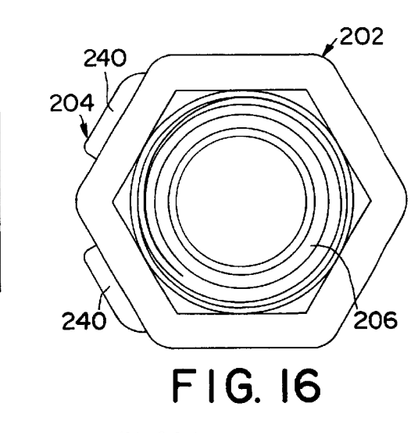
FIG. 16 is an end view of FIG. 15.
Figure 17:
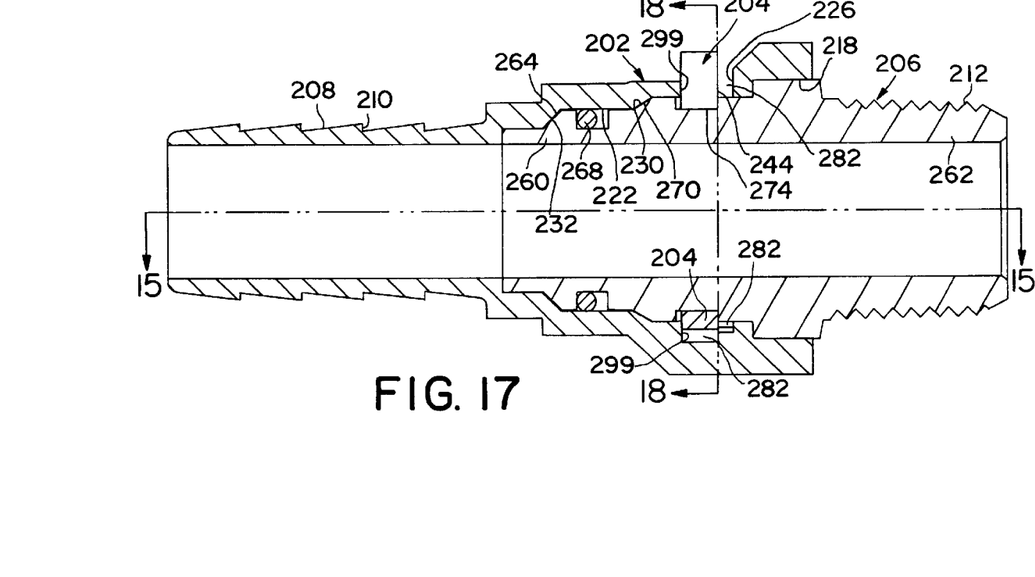
FIG. 17 is a side elevation of the quick-connect coupling shown in FIG. 15 showing the coupling in an unlocked mode.
Figure 18:
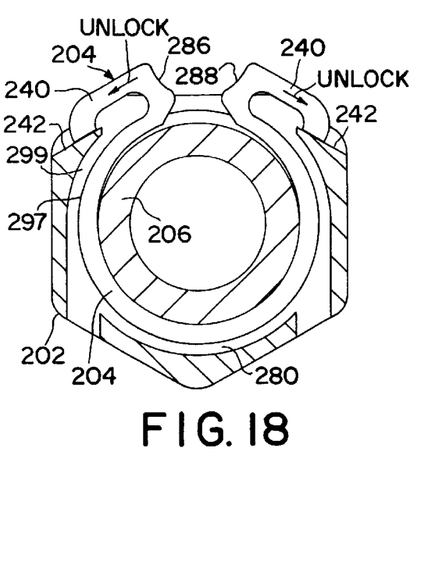
FIG. 18 is an elevation taken along lines 18—18 of FIG. 17.

As is seen in FIGS. 15 and 17 the cavity 250 is wider than the width of the substantially C-shaped detent 204 thus providing an axial gap 282 when the female member 202 and male stem member 206 are in the unlocked mode. As long as the gap 282 remains, the substantially C-shaped detent 204 can expand radially into the space 282, which as seen in FIGS. 15 and 18, surrounds the substantially C-shaped detent 204. Since the substantially C-shaped detent 204 can expand radially, the male stem member 206 can be withdrawn by pushing end surfaces 286 and 288 apart as is shown in FIG. 18. This may be done with one hand by pressing one's thumb against the surfaces 286 and 288 toward the gap 238 that separates the surfaces. As is also seen in FIG. 18, the legs 240 then slide outwardly on the surfaces 242 of the female member 202. As will be more apparent by the discussion hereinafter, the coupling 200 is only movable to the unlocked mode when it is unpressurized and radial spreading of the substantially C-shaped detent 204.

Referring now to FIGS. 19–22 where the quick-connect coupling 200 is shown in the locked mode, it is seen that the axially facing, radially extending surface 244 on the substantially C-shaped detent 204 engages the radially extending axially facing surface 226 which provides one side of the slot 228 extending through the female member 202. Since the substantially C-shaped detent 204 is seated within the locking groove 274, the male stem 206 can not be withdrawn from the female member 202. Moreover, the O-ring 268 is still in radial engagement with axially extending, radially facing sealing surface 222 of the sealing section 220 in the female member 202. Consequently, the male stem member 206 is both locked and sealed within the female member 202.

Figure 19:
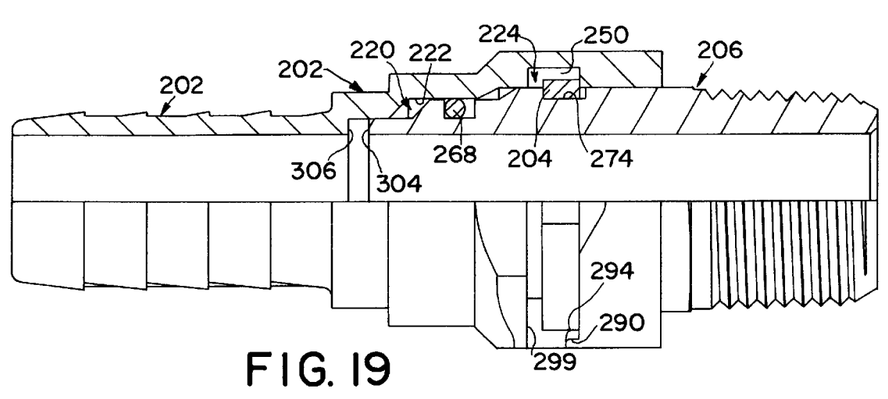
FIG. 19 is a view similar to FIG. 15, but showing the coupling in a locked mode.
Figure 20:
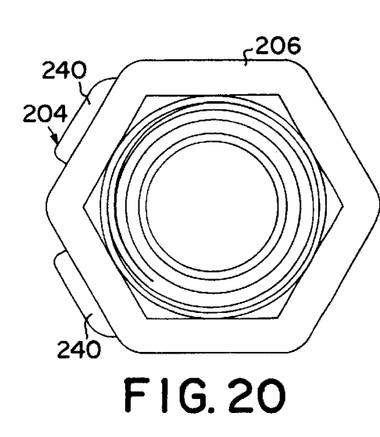
FIG. 20 is an end view of FIG. 19.
Figure 21:
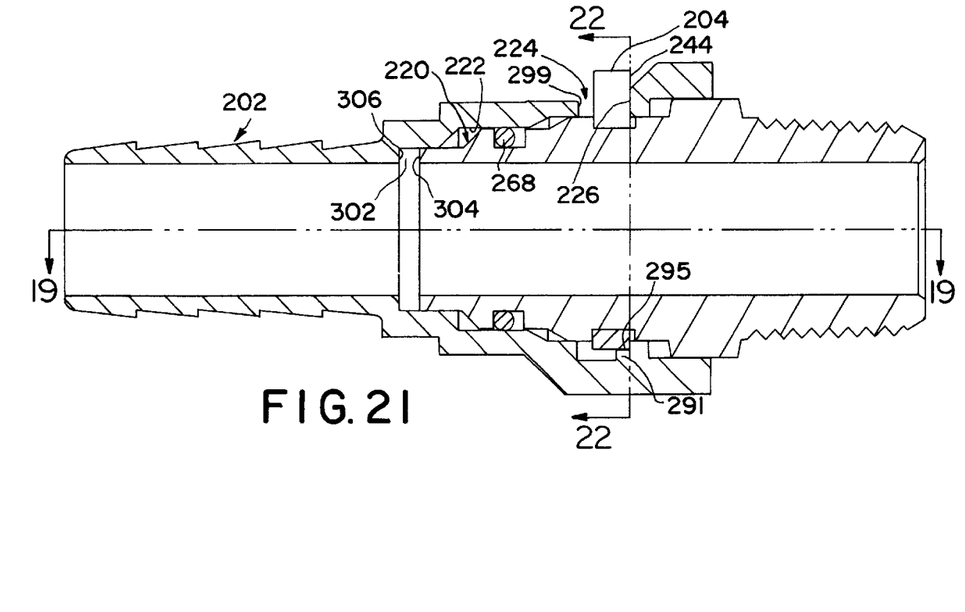
FIG. 21 is a side elevation of the coupling of FIG. 19 showing the coupling of a locked mode.
Figure 22:
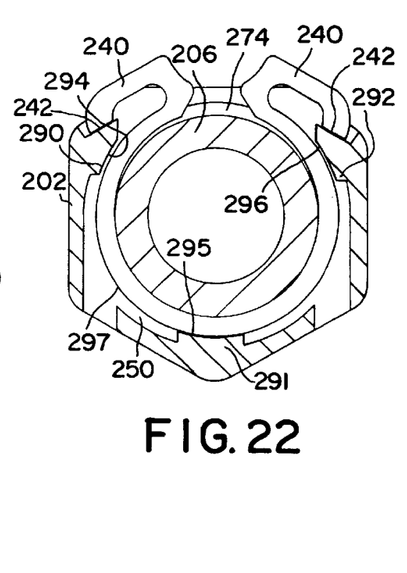
FIG. 22 is an elevation taken along line 22—22 of FIG. 21.

As is seen in FIG. 22, the cavity 250 has three projections 290, 291 and 292 which have blocking surfaces 294, 295 and 296 thereon which engage the external surface 297 of the substantially C-shaped detent 204 preventing radial expansion thereof and thus keeping the substantially C-shaped detent within the locking groove 274 of the male stem member. As is seen in FIGS. 19 and 21 as well as FIGS. 15 and 17 the projections 290, 291 and 292 are axially spaced in the cavity 250 from the opposite surface 299 (FIG. 21) of the cavity so as to not engage the substantially C-shaped detent 204 when the substantially C-shaped detent 204 is in the unlocked mode of FIGS. 15–18, but does engage the detent when in the locked mode of FIGS. 19–22.

When the coupling 200 is in the locked mode of FIGS. 19–22, there is a gap 302 between the end 304 of the male stem member 206 and an internal shoulder 306 on the female member 202. When the gap 302 is filled with fluid under the pressure, movement of the male member 206 into the female member 202 is substantially precluded so that as a safety precaution, the members 206 and 202 can not be readily separated when under pressure.

By having the substantially C-shaped detent 204 laterally shifted from the unlocked mode to the locked mode there is visual indication provided as to which mode the coupling 200 is in. Consequently, assemblers and maintenance personnel can tell at a glance whether coupling 200 is locked or not locked without having to physically manipulate the coupling.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A quick connect coupling arrangement for coupling a hose 30 to a male stem member, comprising:
   a non-circular portion on the male stem member and a locking groove disposed therein between a non-threaded insertion end and a coupling end thereof
   a female member with a non-threaded interior and having a first end portion adapted for connecting with the hose and having a second end portion configured as a socket for receiving the male stem member; the female member having a non-circular section adapted to receive the non-circular portion of the male stem member; a sealing section between the non-circular section and the first end portion, and a locking section, the locking section including an axially facing, radially extending shoulder and a radially opening slot, and
   a substantially annular detent inserted through the radially opening slot in the female member and disposed within the locking section of the female member, the detent being disposed around the male stem member and in the locking groove of the male stem member and having a first axially facing surface for engaging the axially facing radially extending shoulder of the female member when the non-circular portion of the male stem member is within the non-circular section of the female member, whereby the male stem member is rotationally and axially locked within the female member.

2. The arrangement of claim 1 wherein the annular detent has a selected width in the axial direction and is mounted within an arcuate cavity having an axial extent greater than the selected width of the substantially annular detent; whereby upon pressuring the coupling arrangement with internal fluid pressure the male stem member moves in a direction away from the female member engaging the axially facing surface of the annular detent with the first axially facing radially extending shoulder of the female member.

3. The arrangement of claim 2 wherein the arcuate cavity has a first section which is radially unobstructed allowing radial movement of the substantially annular detent and a second section having blocking elements which inhibit radial movement of the annular detent.

4. The arrangement of claim 3 wherein the substantially annular detent is resilient and substantially C-shaped allowing the detent to be radially slid through the radially opening slot in the female member and allowing the substantially annular detent to expand radially to receive the male stem member therethrough and to thereafter contract into the locking groove in the male stem member.

5. The arrangement of claim 4 wherein the substantially annular detent member has a pair of spring arms extending therefrom for engaging blocking elements on the female member to prevent radial expansion of the substantially annular detent member when the axially facing surface of the detent member engages the axially facing radially extending shoulder of the female member.

6. The arrangement of claim 5 wherein there is a seal disposed between the socket portion of the female member and the male stem member.

7. The arrangement of claim 6 wherein the seal is disposed between the locking groove and the insertion end of the male stem member.

8. The arrangement of claim 7 wherein the seal is an O-ring positioned in a sealing groove in the male stem member.

9. The arrangement of claim 8 wherein the male stem member includes a first frustoconical ramp adjacent to the sealing groove and a second frustoconial ramp adjacent to the locking groove, the second ramp having a diameter greater than the first ramp.

10. The arrangement of claim 9 wherein the female member and substantially annular detent are made of plastic material.

11. The arrangement of claim 10 wherein the plastic material of the substantially annular detent is TOUGHENED ZYTEL® and the plastic material of the female member is gloss-filled NYLON®.

12. The arrangement of claim 1 wherein the female member and substantially annular detent are made of plastic material.

13. The arrangement of claim 12 wherein the plastic material of the substantially annular detent is TOUGHENED ZYTEL® and the plastic material of the female member is glass-filled NYLON®.

14. The arrangement of claim 4 wherein the female member and substantially annular detent are made of plastic material.

15. The arrangement of claim 14 wherein the plastic material of the substantially annular detent is TOUGHENED ZYTEL® and the plastic material of the female member is glass-filled NYLON®.

16. The arrangement of claim 1 wherein the male stem member is made of metal and is machined from hex-bar stock and wherein the non-circular portion of the female member is hexagonal and compliments the hex-bar stock.

17. The arrangement of claim 16 wherein the metal is brass.

* * * * *